United States Patent [19]

Raush et al.

[11] 4,407,531
[45] Oct. 4, 1983

[54] EXTERNALLY ADJUSTABLE SEAL AND BEARING STRUCTURE

[75] Inventors: Russell G. Raush, Conestoga; Raymond A. Alleman, Lancaster, both of Pa.

[73] Assignee: RCA Corporation, New York, N.Y.

[21] Appl. No.: 248,063

[22] Filed: Mar. 27, 1981

[51] Int. Cl.³ .............................................. F16L 5/02
[52] U.S. Cl. .................................... 285/158; 285/338
[58] Field of Search ........ 285/338, 196, 158, DIG. 10

[56] References Cited

U.S. PATENT DOCUMENTS

| 1,819,417 | 8/1931 | Holmgreen | 285/158 X |
| 2,828,980 | 4/1958 | Craig et al. | 285/302 X |
| 2,951,721 | 9/1960 | Asp | 285/DIG. 10 X |
| 3,847,392 | 11/1974 | Horwinski | 285/338 X |
| 4,252,348 | 2/1981 | Kojima | 285/158 |

*Primary Examiner*—Thomas F. Callaghan
*Attorney, Agent, or Firm*—Eugene M. Whitacre; Dennis H. Irlbeck; Lester L. Hallacher

[57] ABSTRACT

An externally adjustable seal and bearing structure includes an external and an internal tube. The tubes overlap within the container and are radially separated by a seal and a bearing. The bearing permits the tubes to oscillate with respect to one another. The bearing is in two parts which are separated by the seal. The bearing and the seal are arranged between a retainer and a stop plate. An adjustment nut external of the container is threaded on to the external tube and tightening of the nut longitudinally moves the external tube with respect to the internal tube. The stop plate and retainer act against the bearing parts to compress and radially expand the seal between the two tubes.

9 Claims, 1 Drawing Figure

U.S. Patent  Oct. 4, 1983  4,407,531
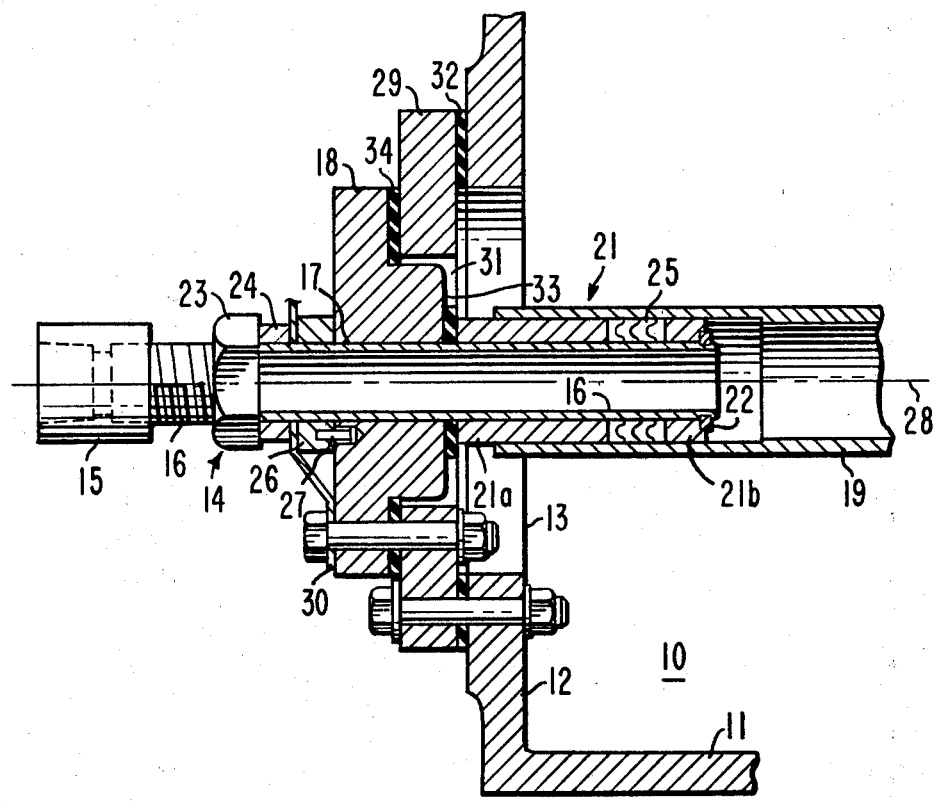

EXTERNALLY ADJUSTABLE SEAL AND BEARING STRUCTURE

BACKGROUND OF THE INVENTION

This invention relates generally to the production of shadow masks for color television tubes and particularly to an externally adjustable internal rotary seal and bearing structure for the fixed external and oscillating internal acid spray tubes associated with the etch tanks used to produce such shadow masks.

During the production of shadow masks for color television tubes, the shadow mask material is coated with a light sensitive acid resistant material. The coating is exposed to light to produce the aperture pattern and the profile of the shadow mask on the acid resistant material. After the exposure to light, the coating is developed and the exposed portions of the coating are washed away. Thereafter, the entire strip of shadow mask material is passed through an etchant or acid bath until the apertures are completely etched through and the profile of the shadow mask is partially etched through. The etching takes place in an etch tank which is inert to the corrosive action of the acid. However, the etching acid is provided to the etch tank from an external source through external tubes which communicate with internal tubes. The internal tubes have spray nozzles so that the acid sprays over the entire surface of the shadow mask strip. Uniform spraying is assured by oscillating the internal tubes about their longitudinal axis. Because the etching acid is provided from an external source, it is essential to effectly seal the tubes within the tank to prevent dangerous, damaging, and costly leakage of the acid outside the etch tank. It also is essential to provide a bearing and seal arrangement which permits relative oscillation between the external and internal tubes and which simultaneously seals to prevent leakage of acid. Such leakage can reduce the spray pressure of the etchant and thereby disturb the uniform flow of acid over the mask material resulting in nonuniform etching of the shadow masks.

In the prior art, two types of seals are presently available. One type is external to the etch tank, the other is internal to the etch tank. Both of these types of seals have inherent disadvantages. The external seal is disadvantageous because leakage occurs outside the tank and must be collected and disposed of. Additionally, the external seal is difficult to adjust to prevent leakage. It is customary to make seal adjustments while the process is operating in order to see the effect of the adjustment, and be certain that the seal is no tighter than necessary, for this would shorten the life of the seal. Therefore, the individual must make the adjustment in the proximity of the hot, leaking acid and thus, is in danger of being scalded and chemically harmed by exposure to the acid. Making the adjustment is also dangerous because the oscillating linkage is often in the proximity of the seal further endangering the mechanic. The internal seal is disadvantageous because leakage prevention adjustments must be made inside the tank, and thus cannot be made while the etching is in process. Because adjustments cannot be made while the system is operating, the minimum force required to prevent leakage cannot be determined. Force exceeding the minimum results in a greater torque required for oscillating the internal tube and the seal life is shortened.

The instant invention overcomes these disadvantages by the provision of a seal and bearing structure which is internally sealable and externally adjustable.

SUMMARY OF THE INVENTION

An externally adjustable seal and bearing structure for admitting fluid from an external source to the inside of a container includes an external tube. The external tube passes through a bore and a stop plate to the inside of the container. An internal tube and the external tube coaxially overlap within the container and the tubes are rotatable with respect to one another. Bearing means is arranged radially between and coaxial with the tubes so that the tubes are rotatable about the common longitudinal axis. Seal means is arranged radially between and coaxial with the tubes. Retainer means retains the overlapping relationship of the tubes. An external means longitudinally moves the external tube with respect to the internal tube to radially expand the seal against the tubes and thereby prevent fluid leakage between the tubes.

BRIEF DESCRIPTION OF THE DRAWINGS

The single drawing is a cross section of the preferred embodiment of the invention.

DETAILED DESCRIPTION OF THE PREFERRED EMBODIMENT

In the drawing, a tank 10 includes a bottom 11 and a side 12, both of which are shown broken away. The side 12 includes an aperture 13 through which acid is passed from an external source (not shown). The external acid source is coupled to a seal and bearing structure 14 by a coupling 15.

The seal and bearing structure 14 includes an external tube 16 which passes through a bore 17 in a stop plate 18 to the inside of the tank 10. An internal tube 19 is coaxial with and partially overlaps the external tube 16 inside the tank 10. The coaxial relationship of the tubes 16 and 19 is retained by a bearing means 21 which includes a first portion 21a and a second portion 21b. A seal means 25 also radially extends between the internal tube 19 and external tube 16 and is longitudinally positioned between the bearing portions 21a and 21b. In the preferred embodiment shown, the seal 25 is comprised of a plurality of commercially available Teflon V-Rings which expand radially when compressed. However, other types of seals which are acid inert and radially expansible when longitudinally compressed can be used. Retainer means 22, such as a snap ring, is affixed to the end of the external tube 16 so that the bearing means 21 and the seal means 25 are pressed between the stop plate 18 and the retainer 22.

An external nut 23 is threaded on to the outside portion of the external tube 16 and acts against the outside surface of stop plate 18 through a spacer 24, a thrust bracket 30 and a locking collar 26. The locking collar 26 is pinned to the stop plate 18 by way of a pin 27 to prevent rotation of the stationary external tube 16 because of the oscillation of the internal spray tube. The thrust bracket 30 prevents pressure in the internal tube 19 from compressing the seals 25. The external tube is locked by the locking collar 26 and therefore the thrust bracket 30 prevents both the external tube and the locking collar from longitudinal movement.

Fluid leakage along either the internal tube 19 or the external tube 16 is prevented by the seal 25 which is arranged between the bearing portions 21a and 21b.

Should any such leakage occur, sealing adjustment can be made external of the tank 10. Such adjustment can be made simply by loosening the locking collar 26 and then tightening the external nut 23 on the external tube 16. This action longitudinally slides the external tube 16 to the left and causes the internal surface of the stop plate 18 and the retaining ring 22 to act against the ends of the bearing portions 21a and 21b respectively. The bearing portions 21a and 21b thus compress the seal 25 and radially expand the seal against the internal and external tubes.

During the etching of the shadow masks, the internal tube 19 oscillates about the longitudinal axis 28 about which the tubes 16 and 19 are coaxially arranged. This oscillation is made possible by the bearings 21a and 21b. However, because the seal 25 is radially expanded against the oscillating tube 19, the seal 25 may tend to wear thereby enabling fluid to leak along the tube. This difficulty is corrected by the outside adjustment because a slight turning of the external nut 23 further expands the seal 25 to stop the leakage even when the internal tube 19 is oscillating and without the person doing the adjusting being exposed to leaking hot acid. Additionally, because the adjustment is made while the tube 19 is oscillating, the adjustment force is limited to the minimum required to stop the leakage and the life of the seal 25 is thereby preserved.

In the preferred embodiment shown, a spacer 29 is arranged between the stop plate 18 and the side wall 12. The spacer 29 includes an aperture 31 which is smaller than the aperture 13 contained within the side wall 12. An acid resistant seal 32 is arranged between the spacer 29 and the side wall 12. The stop plate 18 includes a stepped down portion 33 which closely fits within the aperture 31 of the spacer 29 and another seal 34 is arranged between the stop plate 18 and the spacer 29. This arrangement is advantageous because a plurality of the internal tubes 19 are used to spray the etching on to the shadow mask material. Accordingly, if a need to change the centering of the tubes 19 arises, the change can be easily affected simply by relocating the apertures 31 in the spacers 29 without changing any other dimensions or features of the seal 14. Thus, if desired, the spacer 29 can be eliminated simply by decreasing the size of the aperture 13 in the side 12. Additionally, if desired, the stop plate 18 can also be totally eliminated so that the bore 17 is placed directly into the side of the tank and the side 12 of the tank then serves as the stop plate 18 to compress the seal.

It should be noted that the other end (not shown) of the internal tube 19 extends through the other side wall (not shown) of the tank 10. This other end is permanently blocked off and the acid, therefore can not leak out. The oscillating mechanism is coupled to this other end of the tube and therefore adjustments of the seal 25 can be made without any danger from such mechanism.

What is claimed is:

1. A seal and bearing structure for admitting fluid to the inside of a container from a fluid source external of said container comprising:
    a stop plate having a bore extending from the outside of said container to the inside of said container;
    an external tube passing through said bore for admitting fluid to the inside of said container;
    an internal tube coaxial with and oscillatory with respect to said external tube and positioned so that said tubes overlap;
    bearing means having at least two bearing portions arranged radially between and coaxial with said external and internal tubes whereby said tubes are longitudinally oscillatory with respect to one another, one of said bearing portions contacting said stop plate;
    seal means arranged radially between and coaxial with said external and internal tubes, and positioned longitudinally between said bearing portions;
    retainer means for retaining the overlapping relationship of said tubes;
    external means for longitudinally moving said external tube with respect to said internal tube whereby said stop plate and said retainer means compress said bearing means against said seal means to radially expand said seal means against said external and internal tubes to prevent fluid leakage along said tubes; and a thrust bracket coupling said stop plate and said external tube for preventing longitudinal movement of said external tube in response to pressure in said internal tube.

2. The seal and bearing structure of claim 1 wherein said seal means includes a plurality of acid inert radially expansible rings.

3. The seal and bearing structure of claim 2 wherein said external means for longitudinally moving is a nut externally threaded onto said external tube.

4. The seal and bearing structure of claim 3 wherein said external tube is positioned inside said internal tube in the region of said overlap.

5. The seal and bearing structure of claim 1 wherein said stop plate is a side of said container.

6. The seal and bearing structure of claim 3 or 4 wherein said stop plate is a separate member sealably fixed to a side of said container.

7. The seal and bearing structure of claim 6 further including a spacer sealed between said separate member and a side of said container.

8. The seal and bearing structure of claim 1 further including a locking collar arranged between said thrust bracket and said stop plate for preventing rotation of said external tube when said locking collar is locked.

9. The seal and bearing structure of claim 5 further further including a locking collar arranged between said thrust bracket and said stop plate for preventing rotation of said external tube when said locking collar is locked.

* * * * *